Sept. 5, 1961
C. A. HERMAN ET AL
2,998,870
AIR COOLED BRAKE DRUM
Filed Aug. 4, 1954
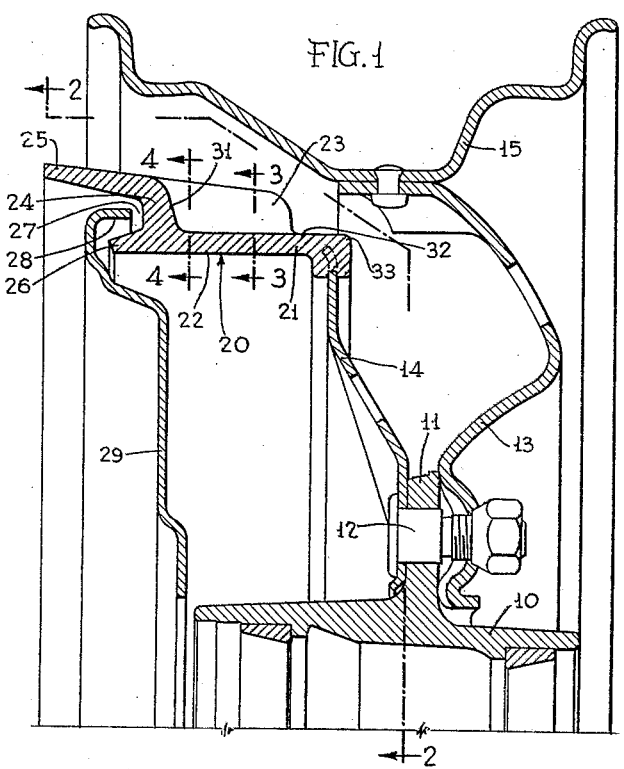
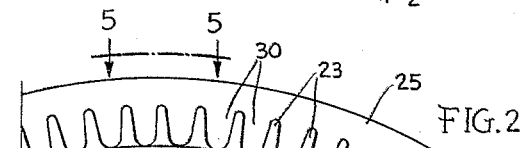
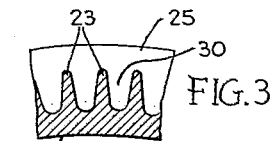
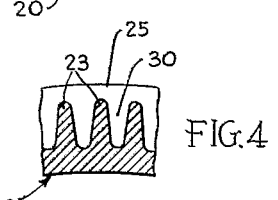
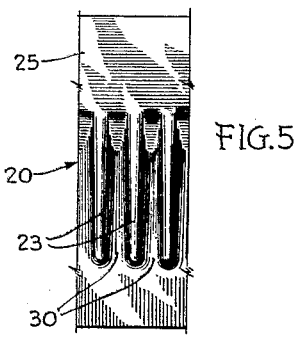
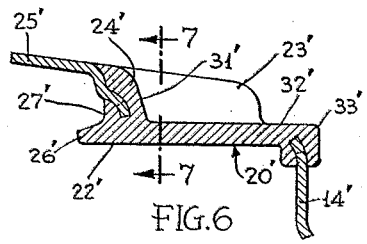
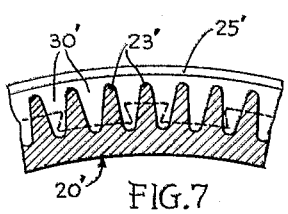
INVENTORS
CLARENCE A. HERMAN
LESLIE H. KLAUER
BY
Wm. R. Glisson
ATTORNEY

2,998,870
AIR COOLED BRAKE DRUM
Clarence A. Herman, Grosse Pointe Farms, and Leslie H. Klauer, Grosse Pointe Woods, Mich., assignors to The Budd Company, Philadelphia, Pa., a corporation of Pennsylvania
Filed Aug. 4, 1954, Ser. No. 447,777
6 Claims. (Cl. 188—264)

This invention relates to an air cooled brake drum and has for an object the provision of improvements in this art.

One of the particular objects is to provide a brake drum which will have greatly improved heat dissipating characteristics.

Another object is to provide maximum heat dissipation with a minimum weight of added metal.

Another object is to provide a brake drum which has high cooling efficiency but which is not subject to serious distortion with changes in temperature.

Another object is to provide a ribbed drum which has a good chucking shape for machining operations.

Another object is to provide a drum having a part which projects out axially in a position to be located in the air stream inside the wheel.

Another object is to provide a ribbed drum which is easy to manufacture, the ribs being of such shape that they can be readily formed by casting.

Another object is to provide a drum having substantial ribs which are not easily broken.

The above and other objects and advantages of the invention will be apparent from the following description of an exemplary embodiment, reference being made to the accompanying drawings, wherein:

FIG. 1 is an axial section through the upper half of a wheel provided with a brake drum embodying the invention;

FIG. 2 is an end elevation and section taken on the line 2—2 of FIG. 1 looking at the supported end of the drum;

FIG. 3 is a fragmentary section taken on the line 3—3 of FIG. 1;

FIG. 4 is a fragmentary section taken on the line 4—4 of FIG. 1;

FIG. 5 is a partial top plan view taken on the line 5—5 of FIG. 2;

FIG. 6 is a partial axial section of a modified form; and

FIG. 7 is a section taken on the line 7—7 of FIG. 6.

As shown in FIGS. 1 to 5, a hub 10, provided with a circumferential flange 11, has secured thereto, as by bolts 12, a wheel disk 13 and a drum head 14. A rim 15 is secured on the disk 13.

A brake drum 20, with which the present invention is principally concerned, is secured on the notched periphery of the head 14, as by casting it thereon. Cast iron ordinarily is used.

The drum 20 comprises a cylindrical portion 21 having an interior braking surface 22 and on the exterior surface having circumferentially spaced axially aligned cross ribs 23.

Near the outer end of the drum (the inner end with reference to the wheel on a vehicle) an annular radial rib 24 extends into a flared annular circumferential flange or rib 25. The flange 25 may have different degrees of flare from a radial disposition, preferably making a considerable angle with the radial plane, and, as shown, approaches fairly closely to a cylindrical disposition.

Outside the radial rib 24 and between the flange or rib and an extension 26 on the end of the cylindrical portion 21 there is provided an annular axially opening sealing groove 27 into which extends the flange 28 of a sealing plate 29.

The cross ribs 23 extend against and are integrally formed with the radial rib 24 which carries the flared flange or rib 25 so as to buttress and support the flange. In the spaces or depressions 30 between ribs 23 the surface 31 of the rib 24 is sloped upward and outward to promote the passage of air thereover.

At the inner or head end of the drum, as at 32, the ribs 23 are foreshortened to save material where cooling effects are least useful and to provide a smooth annular surface for chucking in a lathe. A rather square shoulder 33 is provided at the inner end to increase the length of the smooth annular chucking surface.

The cross ribs 23 taper in radial height from the inner end at the head end 32 of the drum toward the outer end at the annular radial rib 24. The spacing between ribs 23 is somewhat greater than the rib thickness. The ribs also taper in circumferential thickness along their length. Both ribs and spaces are rounded at their radial ends. This shape is well suited for casting without breakage of parts and the parts are quite strong and not easily broken in use.

The annular rib or flange 25 is quite long, being about the same length as the cross ribs 23, as shown in FIG. 1, so as to extend out into the air stream beyond the wheel rim 15 and the sealing plate 29. The outwardly sloping surface of the flange 25 aids in the removal of any water which may collect in the sealing groove by throwing it off centrifugally as the wheel rotates. The flange also protects the seal from water and this permits the seal to have a wider spacing between parts, making manufacture easier and allowing more cooling air to flow through the drum.

The form shown in FIGS. 6 and 7 is very similar in general to the form shown in FIGS. 1 to 4, and the same references are used, but the modified form departs from the first form by having the flared flange 25' formed of a material different from that of the main drum and this flange 25' is secured and made substantially integral at its notched inner end with the drum, as by having the drum material cast around the root portion. The flange or rib 25' may be made of steel or brass or copper or any desired material which will not melt when the cast iron drum is poured around its root. Thus a flange of higher heat dissipating characteristics may be incorporated. If desired, the flange may be roughened or struck out to form tabs or otherwise formed to further aid heat dissipation.

The flared flange or rib strengthens the drum and aids in preventing distortion, such as bell-mouthing, and does not unduly rigidify the end of the drum or dam the passage of air over the cross ribs as would a radial rib of the same general weight and thickness.

The cross ribs are of such size and spacing as to avoid circumferentially spaced high spots and axial bowing along the length of the drum.

The wheel disk 13 and drum head 14 may be provided with spaced holes for air circulation over and through the brake drum, if desired.

Tests have shown that the present drum gives far better braking service than non-ribbed drums and very much better service than the best of ribbed drums heretofore provided. It is capable of making two to three times as many repetitive stops as does a standard non-ribbed drum in reaching normal limiting or non-safe operating drum temperatures. Under continuous operation or steady state temperature conditions the present flared rib and cross rib drum absorbs about 67% more power than the usual drum but with only 45% increase in drum weight. Moreover, the combination of cross ribs and flared rib gives more increase in braking effectiveness than would be expected from their combination. For example, cross ribs alone gave about 20% increase; the flared rib alone gave about 20% increase; but the combined cross ribs and flared rib together gave an increase of over 60%.

It is thus seen that the invention provides an improved, easily manufactured and durable brake drum.

While two forms of the invention have been described, it is to be understood that there may be other embodiments within the scope of the invention.

What is claimed is:

1. A brake drum construction comprising in combination, a cylindrical braking drum having a base at its inner end secured to a wheel structure having a wheel rim surrounding the drum, the drum on its outer end having an annular shape to cooperate with a sealing plate, circumferentially spaced axially directed integral radial cross ribs on the outer surface of the drum starting from a point near the base or inner end and at their radially inner portions ending at a point near but short of the outer end of the drum, an integral annular radial rib surrounding the drum near but short of the end of the drum, said cross ribs for the height of said radial rib terminating against the side and being integral with said radial rib, and an integral annular generally axially directed but radially outwardly flared rib extending outward from the radially outer edge of said radial rib, the flared rib being disposed radially outside the drum and sealing plate, leaving an annular sealing groove between the inner end of the outwardly flared rib and the end of the drum, and the flared rib extending axially for a considerable distance beyond the sealing plate and end of the drum to stand exposed in the air stream past the sealing plate and drum.

2. A brake drum construction comprising in combination, a cylindrical braking drum having a base at its inner end secured to a wheel structure having a wheel rim surrounding the drum, the drum on its outer end having an annular shape to cooperate with a sealing plate, circumferentially spaced axially directed integral radial cross ribs on the outer surface of the drum starting from a point near the base or inner end and at their radially inner portion ending at a point near but short of the outer end of the drum, and integral annular radial rib surrounding the drum near but short of the end of the drum, said cross ribs for the height of said radial rib terminating against the side and being integral with said radial rib, and an integral annular generally axially directed but radially outwardly flared rib extending outward from the radially outer edge of said radial rib, flared rib being disposed radially outside the drum and sealing plate, leaving an annular sealing groove between the inner end of the outwardly flared rib and the end of the drum, and the flared rib extending axially for a considerable distance distance beyond the sealing plate and end of the drum to stand exposed in the air stream past the sealing plate and drum, the axially inner side of the annular radial rib being axially and radially outwardly inclined toward the flared rib to provide smooth flow of air along the cross ribs.

3. A brake durm construction comprising in combination, a cylindrical braking drum having a base at its inner end secured to a wheel structure having a wheel rim surrounding the drum, the drum on its outer end having an annular shape to cooperate with a sealing plate, circumferentially spaced axially directed integral radial cross ribs on the outer surface of the drum starting from a point near the base or inner end and at their radially inner portions ending at a point near but short of the outer end of the drum, an integral annular radial rib surrounding the drum near but short of the end of the drum, said cross ribs for the height of said radial rib terminating against the side and being integral with said radial rib, and an integral annular generally axially directed but radially outwardly flared rib extending outward from the radially outer edge of said radial rib, the flared rib being disposed radially outside the drum and sealing plate, leaving an annular sealing groove between the inner end of the outwardly flared rib and the end of the drum, and the flared rib extending axially for a considerable distance beyond the sealing plate and end of the drum to stand exposed in the air stream past the sealing plate and drum, the flared rib being approximately the same axial length as the cross ribs.

4. A brake drum construction comprising in combination, a cylindrical braking drum having a base at its inner end secured to a wheel structure having a wheel rim surrounding the drum, the drum on its outer end having an annular shape to cooperate with a sealing plate, circumferentially spaced axially directed integral radial cross ribs on the outer surface of the drum starting from a point near the base or inner end and at their radially inner portions ending at a point near but short of the outer end of the drum, an integral annular radial rib surrounding the drum near but short of the end of the drum, said cross ribs for the height of said radial rib terminating against the side and being integral with said radial rib, and an integral annular generally axially directed but radially outwardly flared rib extending outward from the radially outer edge of said radial rib, the flared rib being disposed radially outside the drum and sealing plate, leaving an annular sealing groove between the inner end of the outwardly flared rib and the end of the drum, and the flared rib extending axially for a considerable distance beyond the sealing plate and end of the drum to stand exposed in the air stream past the sealing plate and drum, the radially outer surface of the cross ribs and flared rib lying in approximately the same flared cylindrical surface.

5. A brake drum construction comprising in combination, a cylindrical braking drum having a base at its inner end secured to a wheel structure having a wheel rim surrounding the drum, the drum on its outer end having an annular shape to cooperate with a sealing plate, circumferentially spaced axially directed integral radial cross ribs on the outer surface of the drum starting from a point near the base or inner end and at their radially inner portions ending at a point near but short of the outer end of the drum, an integral annular radial rib surrounding the drum near but short of the end of the drum, said cross ribs for the height of said radial rib terminating against the side and being integral with said radial rib, and an integral annular generally axially directed but radially outwardly flared rib extending outward from the radially outer edge of said radial rib, the flared rib being disposed radially outside the drum and sealing plate and extending axially for a considerable distance beyond the sealing plate and end of the drum to stand exposed in the air stream past the sealing plate and drum, the axially inner side of the annular radial rib being axially and radially outwardly inclined toward the flared rib, the flared rib being about the same axial length as the cross ribs, the radially outer surface of the cross ribs and flared rib lying in about the same flared cylindrical surface the elements of which are straight lines, the radially outer surface of the drum inward of the ends of the cross ribs being smooth and shaped as a right cylinder, and the space between the protruding end of the drum and the flared rib forming an annular axially open groove to cooperate with an axially extending flange of the sealing plate.

6. A brake drum construction comprising in combination, a cylindrical braking drum having a base at its inner end secured to a wheel structure having a wheel rim surrounding the drum, the drum on its outer end having an annular shape to cooperate with a sealing plate, circumferentially spaced axially directed integral radial cross ribs on the outer surface of the drum starting from a point near the base or inner end and at their radially inner portions ending at a point near but short of the outer end of the drum, an integral annular radial rib surrounding the drum near but short of the end of the drum, said cross ribs for the height of said radial rib terminating against the side and being integral with said radial rib, and an integral annular generally axially directed but radially outwardly flared rib extending outward from the radially outer edge of said radial rib, the flared rib being disposed radially outside the drum and sealing plate, leaving an annular sealing groove between the inner end of the outwardly flared rib and the end of the drum, and the flared rib extending axially for a considerable distance beyond the sealing plate and end of the drum to stand exposed in the air stream past the sealing plate and drum, the flared rib being formed of a metal different from the metal of the drum and being embedded in and structurally integral with the metal of the radial rib.

References Cited in the file of this patent

UNITED STATES PATENTS

| | | |
|---|---|---|
| 1,990,746 | Nelson | Feb. 12, 1935 |
| 2,003,063 | Batie | May 28, 1935 |
| 2,042,701 | Dake et al. | June 2, 1936 |
| 2,105,176 | Ash | Jan. 11, 1938 |
| 2,181,008 | Bonzach | Nov. 21, 1939 |
| 2,265,938 | Eksergian | Dec. 9, 1941 |
| 2,274,503 | Reid | Feb. 24, 1942 |
| 2,398,501 | Le Jeune | Apr. 16, 1946 |

OTHER REFERENCES

Publications:

Supplement dated January 1950, to September 1949 Progress Report of the American Transit Association Mechanical Division Committee on Brake Noise. (Page 3 only with accompanying drawings.)

Design News (magazine), May 1, 1953, pages 66 and 67.